United States Patent [19]

Doomernik

[11] 4,408,654
[45] Oct. 11, 1983

[54] ACCUMULATOR FOR STORING HEAT OR COLD

[75] Inventor: Cornelis Doomernik, Berghem, Netherlands

[73] Assignee: Doomernik B.V., Netherlands

[21] Appl. No.: 164,540

[22] Filed: Jul. 2, 1980

[30] Foreign Application Priority Data

Jul. 5, 1979 [NL] Netherlands ........................ 7905277

[51] Int. Cl.³ .............................................. F28D 21/00
[52] U.S. Cl. .................................. 165/10; 165/104.17; 165/111
[58] Field of Search .................... 165/104.17, 111, 10; 126/436

[56] References Cited

U.S. PATENT DOCUMENTS

| | | | |
|---|---|---|---|
| 2,996,894 | 8/1961 | Shade | 165/104.17 X |
| 3,029,142 | 4/1962 | Coffinberry | 165/111 X |
| 3,181,600 | 5/1965 | Woodward et al. | 165/111 X |
| 4,170,261 | 10/1979 | Laing et al. | 165/104.17 X |
| 4,170,261 | 10/1979 | Laing et al. | 165/10 |
| 4,219,072 | 8/1980 | Barlow | 165/111 X |
| 4,263,961 | 4/1981 | Morawetz et al. | 165/104.11 X |
| 4,300,622 | 11/1981 | Lindner | 165/104.17 X |

*Primary Examiner*—Albert W. Davis, Jr.
*Attorney, Agent, or Firm*—Burns, Doane, Swecker & Mathis

[57] ABSTRACT

In latent-heat storage accumulators in which a liquid heat exchange medium is directly contacted with a eutectic mixture which is immiscible therewith one often encounters the problem that the exchange liquid entrains droplets and crystals of eutectic mixture and these droplets then freeze and accumulate in coolers outside the accumulator, interrupting proper operation.

According to the invention these droplets and crystals are retained by means of a coalescer. Attempts to filter them out by common filtering methods failed.

5 Claims, 6 Drawing Figures

ACCUMULATOR FOR STORING HEAT OR COLD

This invention relates to an accumulator for heat or cold. The invention relates in particular to an accumulator for heat or cold of the kind comprising a container filled for the greater part with a layer of buffer material melting at a constant temperature and a considerably smaller layer of heat transfer liquid having a lower melting point than said buffer material and a specific gravity which is either lower or higher than both the solid and the liquid buffer material, said transfer liquid being virtually immiscible with the buffer material, the container comprising a conduit for discharging heat transfer liquid from said smaller layer to devices outside the accumulator and a supply conduit for returning heat transfer liquid to distributing means in the layer of buffer material, and thence to cause said transfer liquid to flow upwardly or downwardly in direct contact with the buffer material.

An apparatus of this kind is disclosed in U.S. Pat. No. 2,996,894. In it, it is proposed to use such an accumulator as a cold reservoir for a heat pump. The buffer material used is, for example, water or a eutectic mixture, such as a eutectic salt solution, and the heat transfer liquid is an oil. After being cooled outside the accumulator (for example in the heat pump) this oil is passed to the bottom of the accumulator, where it is sprayed. The droplets formed rise upwards until they reach the layer of oil floating on the buffer material, and on their way exchange heat with the buffer material which thereby is partially frozen. The patent specification states that the solid buffer material accumulates adjacent to the interface of the layers, and that this process can be continued until a thick sludge of solid and liquid buffer material has formed.

The cold stored can then be recovered by heating the oil outside the accumulator to above the melting point of the buffer material and continuing the circulation. Owing to the exchange of heat the buffer material will now melt gradually, while the oil is cooled.

French Pat. No. 1,360,833 describes an accumulator for heat, in which the exchange between the buffer material and the transfer liquid takes place by causing the transfer liquid to float on the buffer material and there vigorously agitating it with a stirrer or by tangentially introducing transfer liquid into the top layer. The preferred buffer material according to the patent specification is a molten salt. When the solid salt is heavier than its melt, heat exchange in this way can only be effected in shallow containers, while in all cases a great amount of energy is required for stirring.

German "Offenlegungsschrift" No. 2,508,447 describes various designs of accumulator, including one in which molten buffer material is pumped from the bottom of a container to the top, where it is contacted with circulating transfer liquid or gas.

German "Auslegeschrift" No. 1,015,019 and Dutch patent application No. 76,01499 describe cold accumulators in which the transfer liquid or its vapour is passed through metal tubes laid in the buffer material, which tubes serve as heat exchanger. The Dutch application additionally proposes using a pump during the melting of the solid buffer material for circulating molten buffer material through the gap between the tubes and the solid buffer material. Owing to the high price of the banks of tubes, however, such an accumulator requires a high capital investment.

Tests with an accumulator as described in U.S. Pat. No. 2,996,894, using as the buffer material water or a eutectic salt solution and as the heat transfer liquid a thin oil, and cooling the transfer liquid in a heat exchanger outside the accumulator proper, show that it is impossible to operate such an accumulator regularly.

In the first place, when the circulating transfer liquid is sprayed into the aqueous phase, a number of minute droplets are formed, which do not coalesce, but remain floating in the aqueous phase. As a consequence, the volume of the aqueous phase is greatly increased and sometimes reaches the outlet for transfer liquid. Liquid buffer material then enters the heat exchanger, where it solidifies, so that the heat exchanger soon becomes clogged.

When the sprayer is replaced by a different distributing means, which does not form fine droplets, it turns out that the drops rise rapidly to the boundary face of the aqueous phase and the oil phase and a sludge of crystals is formed at the boundary face. Yet even then the heat exchanger turns out to become clogged with solid buffer material after some time, which precludes further operation.

An investigation into the cause showed the following:

When a drop of oil having a temperature below the melting point of the buffer material is formed in the buffer material, such drop absorbs heat from the buffer material and at the same time a small quantity of buffer material is thereby solidified and encloses the drop in the form of a thin solid skin. This skin is not always fully closed. The hollow, thin-walled globules of solid buffer material, which are filled with transfer liquid, rise in the buffer material and reach a certain maximum velocity. When they reach the boundary face between buffer material and oil, they retain the same velocity for the time being and consequently rise rather high in the oil layer. Owing to their light apparent weight, they descend only slowly back to the boundary face, the more so as they are retarded by the rising stream of oil. When these globules which float in the oil (and in addition to solid buffer material often also contain some liquid buffer material) are passed together with the oil to the heat exchanger located outside the accumulator, and are there cooled further, a portion of the globules will settle there and eventually clog the heat exchanger.

The use of a filter, a sieve or a screen to retain these globules turned out to be of no avail, for the only result is that the filter, sieve or screen is clogged with solid buffer material, which proves to be firmly adhered to the sieve.

It turns out that these effects continue to occur even after a sludge of crystals is formed at the boundary face between the buffer material and the oil. It is true that a portion of the globules is broken up when passing the boundary layer, so that they do not penetrate into the oil layer, but another portion penetrates through the sludge undamaged and rises in the oil. This even happens when the buffer material is virtually fully frozen.

About these difficulties the U.S. patent and the other literature are completely silent, let alone that they mention methods of solving them.

The present invention provides an accumulator of the type described in the opening paragraph of this specification, which is characterized by one or more coalescers for retaining solid and liquid particles of buffer material, said coalescer or coalescers being provided between the buffer material and the outlet for the heat transfer liquid.

Coalescers are known per se; they are used for intercepting fine liquid droplets from gases or other liquids in which such droplets are floating. A coalescer consists of a mat knitted from a very large number of fine threads or wires (of a thickness which may be much larger than the droplets to be caught) united into a spatial network. The free surface area in a coalescer is commonly 95–99% of the apparent surface area. The material of the threads or wires is not critical for its operation, and in practice a material is used which is inert under operating conditions; if desired, the threads or wires may be corrugated.

It turns out that such a coalescer is capable of catching the globules referred to without becoming clogged. Yet the joint volume of the globules caught is often greater than the volume of the coalescer itself. Presumably the globules smash against the threads or wires of the coalescer, so that the solid buffer material remains behind in the coalescer only.

As the oil which reaches the heat exchanger located outside the accumulator is now free from buffer material, the freezing of the buffer material in the accumulator can proceed without disturbance. Surprisingly it turns out that the buffer material can be frozen as to approximately 99%, while nevertheless the stream of oil can rise in the form of droplets through the porous mass of buffer material without disturbance while at the boundary face even globules surrounded by solid buffer material are still rising. Accordingly, the buffer material does not freeze into a solid block, but to a porous non-caked mass which exhibits many little channels through which the oil can rise.

As the number of rising droplets is very large at any moment, a very large surface area is obtained for the exchange of heat between oil and buffer material. Owing to this very large surface area, the heat exchange may be quite complete, even at a small difference in temperature.

When the buffer material is fully or partially frozen, the cold stored can again be withdrawn from it (or heat can be re-stored in it) by now supplying oil having a temperature just above the melting point of the buffer material instead of oil cooled to below that melting point. The drops of oil then again exchange heat, so that solid buffer material is molten and the oil is cooled down to the melting point referred to. Both during the freezing of the buffer material and during the melting thereof, the temperature of the oil discharged remains practically equal to the melting point of the buffer material, while in both cases the temperature of the oil supplied needs to differ only little from that melting point (for example 2° C.), while yet a large amount of heat can be supplied or discharged per unit of time.

This good heat transfer is maintained from the beginning of the freezing until more than 99% of the buffer material is frozen. It is only at that moment that the temperature of the oil discharged begins to differ appreciably from the melting point. In the same way during melting, the temperature of the oil discharged remains continuously virtually equal to the melting point, and that temperature only begins to differ appreciably after more than 99% of the buffer material is again in the liquid state. At that moment a sudden rise in temperature of the oil discharged is observed.

During the melting of the layer of buffer material the transfer liquid is cooled to just above the melting point of the buffer material. It is found, however, that the transfer liquid is then still just warm enough to melt the solid buffer material present in the coalescer, so that this material then flows downwards again in the liquid form to the layer of buffer material. The result is that during the charging/discharging cycles the coalescer is automatically cleaned.

In accumulators for heat or cold it is of great importance that the cold or heat stored can again be recovered from the accumulator at practically the same temperature at which the cold or heat has been supplied because otherwise thermodynamical losses are suffered as a result of degradation. In the accumulators according to the present invention this ideal is approached very closely, thanks to the large heat exchange surface area.

The buffer material melting at a constant temperature is selected so that the its melting point coincides as well as possible with the temperature at which the heat (or the cold) becomes available. As a consequence the heat or the cold can be stored in the accumulator at the same temperature and when the heat or cold, or a portion thereof is again required at a later time, the heat or cold can be withdrawn from the accumulator at substantially the same temperature.

Examples of materials melting at a constant temperature are singular substances, of which water is an example much used. However, other singular substances may be used.

When the storage temperature differs from 0° C., however, one will often consider whether it is possible to use a mixture of water and one or more salts, which melts at a constant temperature. Such mixtures are called eutectic mixtures. Examples of eutectic mixtures with the eutectic temperatures pertaining to them are the following aqueous solutions:

|  | Concentration | $T_E$ °C. |
| --- | --- | --- |
| $MgSO_4.7H_2O$ | 64 | −5.2 |
| KCl | 24.6 | −10.7 |
| $NH_4Cl$ | 22.0 | −15.8 |
| NaCl | 30.7 | −21.2 |
| NaBr | 67 | −28 |
| $MgCl_2.6H_2O$ | 84 | −33.6 |
| $CaCl_2.6H_2O$ | 143 | −55 |

Examples of eutectic mixtures melting above 0° C. are:

|  | $T_E$ °C. |
| --- | --- |
| $Na_3PO_4.12H_2O$ | 66 |
| $NaOH.H_2O$ | 64 |
| $NaC_2H_3O_2.3H_2O$ | 58 |
| $Na_2S_2O_3.5H_2O$ | 48 |
| $Ca(NO_3)_2.4H_2O$ | 47 |
| $FeCl_3.6H_2O$ | 36 |
| $Na_2CO_3.12H_2O$ | 36 |
| $Na_2CO_3.10H_2O$ | 34 |
| $Na_2SO_4.10H_2O$ | 32 |

For higher temperatures one will often use mixtures of salts having a eutectic composition and the desired melting point. In all cases it is favourable when the buffer material used has a great latent heat of fusion and a not too low specific gravity, because then a large amount of heat or cold can be stored in a given volume.

The transfer liquid must be liquid at the operating temperature, and should preferably be liquid at all temperatures which occur in practice during use of the accumulator. In a heat accumulator for which these temperatures are above room temperature, the transfer liquid should preferably remain liquid at room temperature because otherwise the accumulator is difficult to start. Furthermore, the transfer liquid should have a sufficiently low vapour pressure to prevent losses through evaporation and possible risk of fire at all operating temperatures which may prevail.

In a great many cases a suitable petroleum fraction can be found which satisfies the requirements and is inert relative to the buffer material. Other inert liquids are in principle also suitable.

In most cases a transfer liquid will be selected having a specific gravity lower than both the solid and the liquid buffer material, but it is also possible to use a transfer liquid that is heavier than both the solid and the liquid buffer material. At all times, however, the transfer liquid must be sufficiently thin-liquid for it to be easily pumped at the operating temperature and to flow easily through the coalescer.

The invention is illustrated in and by the following examples.

Although, in these examples, the invention is elucidated in the light of embodiments in which heat is stored at temperature below room temperature, it will be clear that in quite an analogous manner the invention can be used to store heat at elevated temperature, provided the nature of the buffer material and the transfer liquid are adapted to the desired storage temperature.

Generally speaking, the solid buffer material and the liquid buffer material will have different specific gravities so that both during freezing and during thawing there will be a change in volume of the buffer material. Such changes in volume must be taken into account in designing the accumulator to prevent that the boundary face of buffer material and transfer liquid can reach the level of the outlet for transfer liquid. Usually, therefore, a volume must be reserved for the transfer liquid which amounts to 15-20% of the volume of the buffer material, while in the top, too, there must be sufficient empty space to prevent overflow. This problem is particularly clear if the buffer material is water, for the ice formed occupies 11% more space than does the water from which it is formed. With eutectic mixtures this difference is generally smaller.

Furthermore, the level of the buffer material must be prevented from rising so far as to reach the coalescer.

BRIEF DESCRIPTION OF THE DRAWINGS

Preferred embodiments of the present invention will be described in greater detail with reference to the accompanying drawings wherein like members bear like reference numerals and wherein:

FIG. 1 shows the use of a cold accumulator included in a refrigeration system for a refrigerated warehouse in which, during the day, meat of freshly-slaughtered animals is continuously being introduced into the refrigerated compartments.

For cooling this meat and for compensating for losses of heat through the opening of the entrance, a large amount of cold must be supplied during the day. Overnight the entrances remain closed and once the meat present is fully cooled, a small amount of cold needs to be supplied further to compensate for the small losses. Therefore, without the accumulator, a large compressor capacity is needed for the installation to be able to supply the large amount of cold during the day, but it is not needed overnight, so that the compressors operate to full capacity for as short as approximately 8 hours per day.

Using an accumulator of sufficient capacity and applying a storage temperature approximately equal to that of the coolant circulating in the warehouse it is possible to freeze the accumulator overnight and to withdraw the cold from the accumulator during the day for use in the cold from the accumulator during the day for use in the warehouse. Accordingly, in that case the compressors supply a portion of the cold required and the accumulator supplies the rest. It is then sufficient to have a compressor capacity as low as approximately $\frac{1}{3}$rd of the capacity required without an accumulator.

It is even possible not to use the compressor during the day at all. This only requires selecting a larger accumulator.

Figure 1:
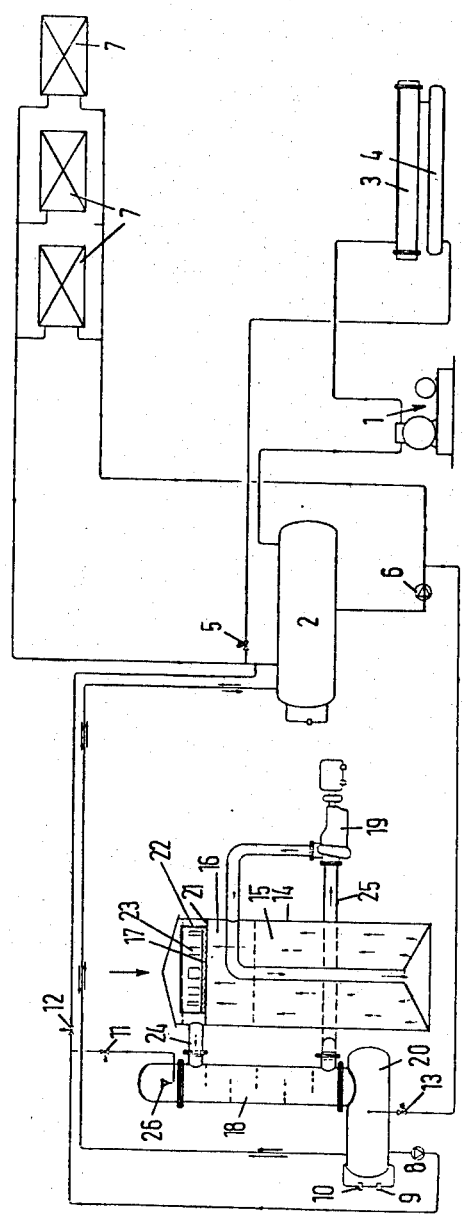
FIG. 1 is a schematic view of a refrigeration system employing an accumulator according to the present invention.

FIG. 1 shows a compressor 1 for a refrigerant, such as ammonia, coolers 3 etc. for the compressed ammonia, and a separating vessel 2, where the liquefied ammonia is separated from that remained in the gaseous form. The gaseous ammonia is returned to compressor 1 through the ducts shown. From separating vessel 2 liquid ammonia is passed through valve 6 to the refrigerated cells 7, where the ammonia is evaporated, gives up its cold, and returns to separating vessel 2 and further to the compressor.

When the compressor has a larger capacity than needed to supply all of the cold required, the amount of liquid ammonia in separator 2 will increase, and the pressure there will be reduced. A pressure-sensitive means will then switch the accumulator to freezing.

The accumulator shown in FIG. 1 comprises a vessel provided with a layer of insulating material (not shown). Contained in the vessel is a layer of buffer material, in this case a eutectic salt solution, designated by 15. On top of this buffer material is a layer 16 consisting of a petroleum fraction, e.g. kerosene. Vessel 14 is closed at the top by a plate 21 with a large round eccentric opening. Provided around the opening is a collar 22 having a series of uniformly spaced openings 22 therein, with an annular channel remaining open between the collar and the wall of vessel 14.

Figure 2:
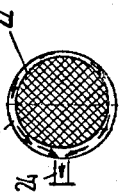

FIG. 2 shows this plate in plan view. The purpose of the collar is to discharge the transfer liquid without turbulence in spite of a varying liquid level. Mounted in the opening within the collar is a coalescer 17, which fully closes the opening.

Figure 3:
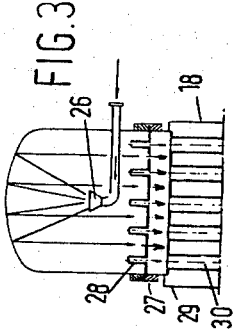
FIGS. 2 and 3 are detail views of portions of FIG. 1.

Mounted just above plate 21 is a side-pipe 24 which connects the accumulator proper with a known per se heat exchanger 18, where the transfer liquid can give up its heat or cold to the refrigerant, in this case ammonia. In the embodiment shown, this heat exchanger consists of a falling-film evaporator in which the transfer liquid flows along the outer wall of a bank of vertical pipes and then through pipe 25 and pump 19 back to the accumulator. The head of heat exchanger 18 is shown in FIG. 3. From a sprayer 26 liquid ammonia is sprayed against a spherical plate and the ammonia then falls on a distributor plate 27 having small holes therein. On this distributor plate a layer of liquid keeps standing, so that a regular stream of liquid ammonia falls from the holes onto pipe plate 29 and thence flows as a uniform film down the inner wall of pipes 30. As stated before, the outer wall of the pipes is in contact with the transfer liquid. The transfer liquid is thus cooled and transports cold to the accumulator.

When the freezing phase is switched on, a magnetic valve 12 is closed and magnetic valves 13 and 11 are opened and pump 19 is started. From separator 2, liquid ammonia now flows to vessel 20, where accordingly the level is increased. As soon as the level is high enough, level regulator 9 switches on pump 8, liquid ammonia is pumped through valve 11 to sprayer 26, ammonia is evaporated, and the transfer liquid transports cold to the accumulator. The evaporated ammonia returns to vessel 20 and escapes through a duct to vessel 2.

The cooled transfer liquid is now passed through pipe 25 and pump 19 to the accumulator where it is passed by a dip pipe under a conical distributor in the bottom part of vessel 14. A distributor as used is this invention in a perforated plate, preferably of a metal, such as steel, comprising a plurality of small holes through which the transfer liquid is distributed in the buffer material. The distributor of FIG. 1 has a large number of holes (not shown) having a diameter of 0.6 mm, with the joint area of the holes constituting approximately 14% of its conical surface. It then turns out that rather large drops of the oil rise through the eutectic mixture (diameter 3-4 mm). Owing to the very large number of these drops, the heat-exchanging surface area is very large (300-500 $m^2/m^3$ buffer material). In this manner a very good distribution of the transfer liquid is obtained, while very little pump energy is required only. In fact, such pump energy would ultimately serve to heat the liquids and this would decrease the efficiency of a cold accumulator. (In the case of a heat accumulator this is less objectionable).

In evaporator 18, the transfer liquid is cooled to a temperature below the eutectic temperature, and when the liquid rises in the form of drops in vessel 14, a skin of solid buffer material is formed around each drop. The major part of this solid material collects in the vicinity of the boundary face between layers 15 and 16, but a portion is found to adhere in coalescer 17. No solid material is found to be present above the coalescer.

The temperature of the transfer liquid discharged through 24 turned out to be practically equal to the eutectic temperature.

The temperature difference is generally less than 0.2° C., and this temperature difference turns out to be maintained until virtually all of the buffer material above distributor 31 has become solid. Thereafter the temperature difference increases rapidly, and this increase has been found to be highly suitable as a signal to terminate the freezing.

When the refrigerated cells 7 consume more cold than the compressors 1 are capable of supplying, the pressure in separating vessel 2 will increase. This can be used as a signal to begin to thaw the accumulator. Of course this can also be started when the accumulator is partially frozen only.

For thawing, magnetic valves 11 and 13 are closed, and pump 19 is re-started. The transfer liquid now arrives in exchanger 18 at a temperature virtually equal to the eutectic temperature, i.e. slightly lower than the boiling point of the ammonia in separating vessel 2 and in vessel 20 which is connected thereto. As a consequence, ammonia will be condensed on the inside of the bank of pipes in 18 and flow down, while at the same time gaseous ammonia flows up from 20 and is likewise condensed. The transfer liquid is thereby warmed up and pumped back to accumulator 14, where it gives up the absorbed heat to the buffer material, causing it to melt. During this process the transfer liquid is again cooled to just above the eutectic melting point and flows through the coalescer back up to the heat exchanger 18. In the coalescer, the transfer liquid gives up some further heat to any solid buffer material which may be present in the coalescer, causing it to melt and flow downwards. Accordingly, the coalescer is automatically cleaned.

The liquefied ammonia collects in vessel 20 and is periodically (controlled by level regulator 10) pumped through magnetic valve 20 to vessel 2, where it is available to cooling cells 7.

Here again, the temperature difference between the transfer liquid discharged through pipe 24 and the eutectic temperature remains virtually constant and less than 0.2° C., and this difference in temperature suddenly rises considerably as soon as all solid buffer material has molten. This increase in temperature difference can be used as a signal for terminating the thawing process.

Although FIGS. 1-3 show an embodiment in which, during the thawing process, the transfer liquid first gives up its cold to refrigerant, such as ammonia, it is naturally also possible to pump the transfer liquid proper to the cells 7 and there to use it as a refrigerant.

A great advantage of the accumulator now proposed is that such a small difference in temperature between transfer liquid and buffer material is sufficient to produce a virtually complete heat exchange. In order that this advantage is not lost, it is highly desirable that the other heat exchangers used in the process also make for the best possible heat exchange at a small difference in temperature.

For that reason the known per se falling-film evaporator is used in the example described above, which in this respect is very favourable. Other exchangers with comparable characteristics may of course be used as well.

FIG. 2 shows an application of the accumulator according to the present invention which can be used as an ice buffer.

In breweries, soft-drink factories, dairy-works and the like, it is often necessary to rapidly cool a given quantity of liquid prepared at a higher temperatuare to a low temperature, for example 5° C. In order to avoid the necessity to install a large compressor capacity an ice buffer is commonly used in such industries, which consists of a container filled with water and equipped with a large number of tubes within which ammonia can be evaporated. As a result a layer of ice is formed on the outer wall of the tubes and in this way a large amount of cold can be stored. If it is desired to use the cold, a stream of water is circulated through the ice buffer and through the spaces or vessels to be cooled. The spaces or vessels are then cooled and in the ice buffer a corresponding amount of ice is molten.

Such ice buffers, however, are expensive in first cost, require a large quantity of refrigerant as a filling, and furthermore, cold is neither absorbed nor given up quite so fast, which in turn requires additional provisions, such as stirrers in the ice buffer.

Figure 4:
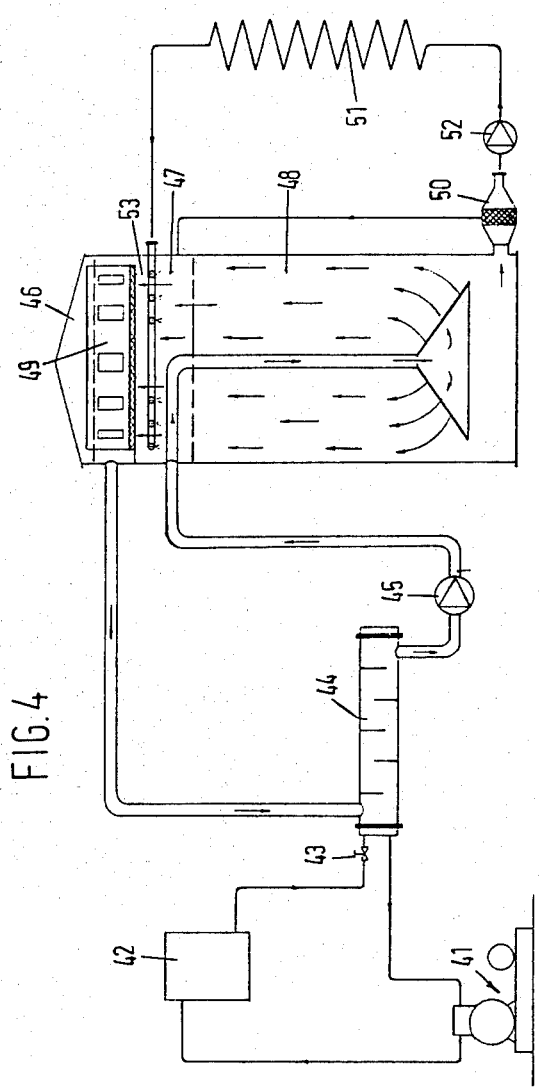
FIG. 4 is a schematic view of a further embodiment of an accumulator according to the present invention.

FIG. 4 shows an accumulator similar to that illustrated in FIG. 1.

The principal difference from the accumulator of FIG. 1 is that in this case water is used as the buffer material instead of a eutectic mixture.

Analogously to FIG. 1, a refrigerant, commonly ammonia, is compressed by a compressor 41, liquefied in a cooler 42, expanded in a valve 43, and then used in a heat exchanger 44 for cooling a transfer liquid, e.g. a petroleum fraction, to slightly below 0° C., e.g. −2° C. This transfer liquid is passed by pump 45 to the distributor and rises as drops through the water in the accumulator which thereby is partially frozen. The transfer liquid, again warmed up to 0° C., is then again pumped round and in this way virtually the entire quantity of water present in the accumulator above the distributor can be frozen, first to a slurry of ice crystals, and then to a porous semi-solid mass.

A second difference from the accumulator of FIG. 1 is that the distributor is placed not quite in the bottom of the accumulator, but slightly higher, so that there is always an amount of liquid water under the distributor, which can immediately be pumped.

From this lowermost portion, water can be pumped by pump 52 to material to be refrigerated, diagrammatically indicated by the zig-zag line 51. To retain any drops of transfer liquid that may be entrained, an extra coalescer 50 is provided just upstream of the pump. The amount of transfer liquid there collected can rise through a vertical duct to the top of the accumulator.

From 51 the warmed-up water is returned to the accumulator to be refrigerated again. For this purpose the water is sprayed into the layer of transfer liquid after the latter has given up its cold to the main mass of the buffer material. Accordingly, the transfer liquid is then warmed up to considerably above 0° C., so that any ice remaining behind in the coalescer will melt from contact with the transfer liquid thus warmed up and flow downwards. The warmed-up water may also be returned to a point above the coalescer, so that the cleaning of the coalescer will proceed even more rapidly. This procedure is not preferred, however. When the warmed-up water has been sprayed into the transfer liquid it sinks downwards and then comes into contact with the ice floating at the boundary face of water and transfer liquid. This will melt the ice and cool the water again to 0° C.

According to the present invention, a given volume of accumulator provides a much larger storage capacity than does a conventional ice buffer, because no large volume needs to be occupied by pipes or remain free for the circulation of water and stirring. The rate of absorption and delivery, too is considerably higher because the drops of transfer liquid have a much larger surface area than can be achieved by pipes while the cold or heat does not need to be passed through a thick layer of ice. Finally, the high cost involved in the construction of the pipe banks are saved. These prior ice buffers have in practice always been built as a rectangular, and hence expensive container.

When water is used as the buffer material, it is found that the quantity of ice to be collected by the coalescer is considerably greater than when a eutectic solution is used. The cause of this is not entirely clear.

For the sake of security, a second coalescer may be provided below or above the first. This prevents with certainty that ice is deposited in heat exchanger 4.

In the embodiment of FIG. 4, the stored cold is assumed to be discharged in the form of water having a temperature of approximately 0° C. It is also possible, however, for the cold to be discharged from the ice accumulator in the form of a suspension of ice crystals in water. In that case one will not of course include a coalescer in the duct for this suspension. Such a suspension remains pumpable up to a concentration of 60-70% ice crystals. In that case the ice crystals may be melted at the position of the articles or spaces to be refrigerated, whereby a lower temperature can be reached and a more efficient utilization of the stored cold.

Refrigeration with a suspension of ice crystals in a water-immiscible liquid, such as toluene, was known per se from U.S. Pat. No. 3,869,870, and U.S. Pat. No. 3,247,678 has disclosed a process for refrigerating with a suspension of ice crystals in brine, but until now no reliable method was known for preparing, in a simple, reliable and reproducible manner, a pumpable concentrated suspension of ice crystals in water without such crystals having the tendency of growing into larger aggregates.

According to the present invention, however, this is possible without any problems.

It also turns out to be possible, in an accumulator according to FIG. 4 to use eutectic brine as the buffer material, and then to pump such brine or a suspension of solid eutectic in the brine to the place where heat is to be discharged. In that case, of course, coalescer 50 should be omitted.

Figure 5:
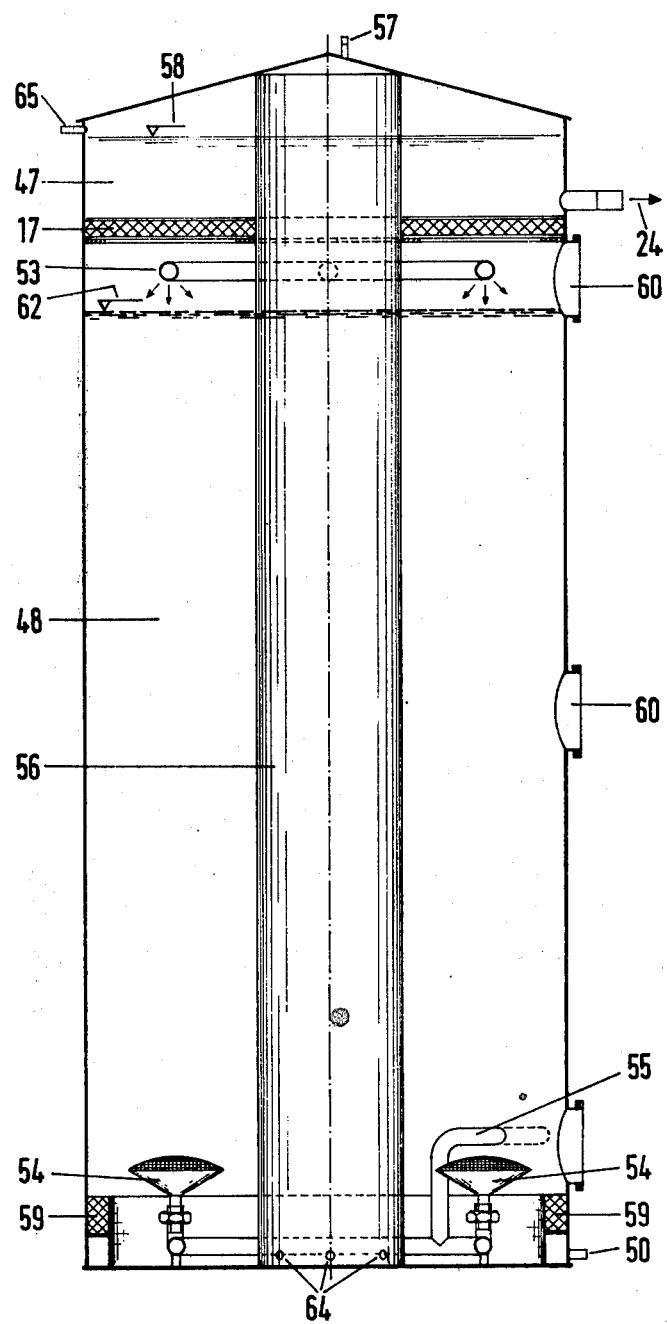
FIGS. 5 and 6 are schematic cross-sectional views of further embodiments of an accumulator according to the present invention.
Figure 6:
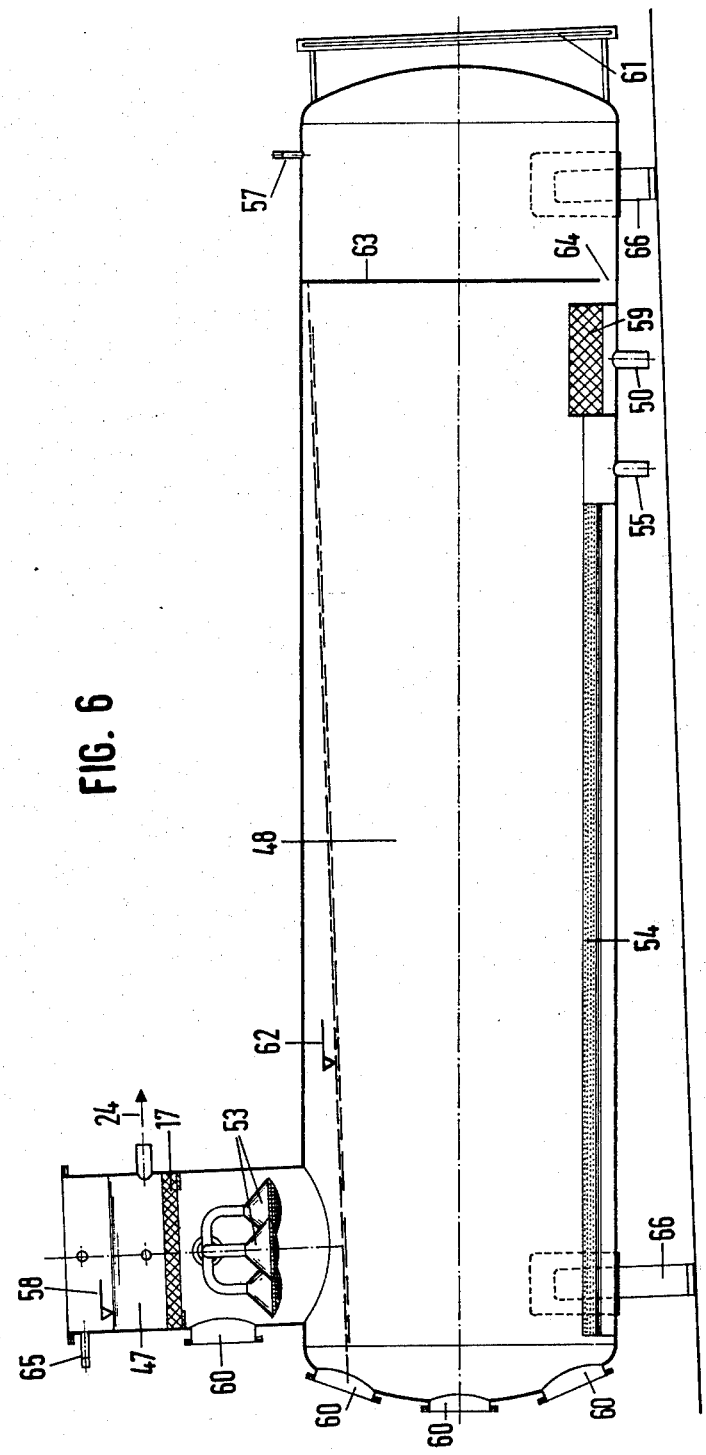

FIGS. 5 and 6 show cross-sectional views of two embodiments of a cold accumulator according to the invention capable of supplying cold water, the water, after being warmed up, being returned to the accumulator. In these two figures, corresponding parts are as much as possible designated by the same reference numerals as in the preceding figures.

A heat transfer liquid, cooled outside the accumulator in a refrigerating means to below 0° C., e.g. −2° C. is supplied through stub 50 and divided into drops by distributors 54, which comprise a perforated metal plate, said drops having a size of, for example 2-4 mm. This transfer liquid absorbs heat from water 48 present in the accumulator, which thereby is cooled and ultimately frozen to form a slurry of fine ice crystals. The rising drops collect above the boundary face between water 48 and the layer of transfer liquid 47, while any ice crystals entrained are retained by coalescer 17. From 24, the transfer liquid is returned to the refrigerating means (not shown).

If it is desired to withdraw cold water from the accumulator, this is discharged through stub 50. In FIG. 5 this stub terminates in an annular channel provided within the accumulator near the bottom thereof. The top of this channel is formed by an annular strip-coalescer 59. In FIG. 6, the stub terminates under a square plate-coalescer 59, confined within a tube narrowly fitting around it. In both cases, therefore, the water discharge through 50 must first flow through this coalescer. Any drops of transfer liquid that would be entrained are thus retained. These drops flow together and escape from the coalescer owing to the difference in specific gravity. The cold water discharged can then give up cold outside the accumulator, whereby it is itself warmed up. This warmed-up water is then again sprayed into the layer of heat exchange liquid through distributor 53; the drops formed fall down and come into the layer of water 48 which at the top contains a slurry of ice crystals. These crystals are molten, whereby the water is again cooled, and this circulation can be continued until all of the ice is molten and the temperature of the water discharged at 50 is increased above 0° C.

During the withdrawal of heat, the supply of cold by means of the heat exchange liquid can be continued without any objections.

Because, when water is frozen, the volume of the ice formed is larger than that of the frozen water, during freezing of the accumulator the boundary face between the water layer 48 and the layer of transfer liquid will be displaced upwardly, which would involve the risk of overflowing. To prevent this, a simple compensation device is provided in the embodiments shown in FIGS. 5 and 6.

In FIG. 5, the compensation device is a vertical tube 47, placed centrally within the cylindrical accumulator and connected at the top in air-tight fashion to the roof of the accumulator. The bottom end of the tube is provided with one or more openings 64; connected to the roof of the accumulator is a supply duct 57 for compressed gas, such as nitrogen or air. The duct is provided with magnetically controlled inlet and outlet valves. If desired, a pressure gauge or a pressure-sensitive sensor may be mounted there. There is further provided a sensor 58 within the accumulator, which gives a signal as soon as the level of the heat exchange liquid comes above or below a pre-selected threshold. Air is then supplied or withdrawn through 57 by means of a known per se, automatically operating auxiliary device (not shown) so that the water level within tube 56 rises or falls, and the level at 58 falls or rises correspondingly. As furthermore the level difference within and without the tube depends on the amount of water present in the frozen state, the pressure in the tube is a measure for this quantity of frozen water, and accordingly, after calibration that quantity can easily be read, either on top of the accumulator or at any other selected place when known per se telemeter devices are used.

In the horizontal accumulator shown in FIG. 6, the compensation device is of slightly different construction. This accumulator consists of a horizontal cylinder disposed at a slight slope on legs 66 and provided at its higher end with a dome housing, among other things, coalescer 17.

At its lower end, the accumulator is provided with a partition 63 secured in air-tight fashion to the circumference of the cylinder, and one or more openings 64 are provided adjacent to its lower edge. In this way a compensation chamber is formed at the lower end, which has the same function and is used in the same manner as the space within tube 56 in FIG. 5.

FIGS. 5 and 6 additionally show a number of observation windows 60, which were used during development work. In a production model such windows are not necessary. FIG. 6 also shows a level gauge glass 61 for observation of the liquid level in the accumulator during filling and replenishing.

When the accumulator is fully thawed the compensation chamber should contain a gas volume at least equal to the increase in volume that will occur when the amount of water present is fully frozen. Then it is possible for the liquid level at 58 to be kept constant at all times. So long as the accumulator contains approximately the correct quantities of water and transfer liquid, when an automatic control of the gas supply and discharge through 57 is used this amount of gas will automatically be supplied when the accumulator is switched on.

As, when the water is circulated outside the accumulator, there is always the possibility that a portion of the water is lost through leakage and the like, it is further desirable to provide a sensor 62 in the accumulator at the boundary face between the water layer and the layer of heat transfer liquid. By means of such a sensor, it can be checked, either when the accumulator is fully frozen or when it is fully thawed, whether the level still has the required height, and if necessary water can be replenished. In this case, too, if desired, the sensor may be connected to an automatically operating apparatus which either gives a suitable signal or independently takes corrective measures.

It will be clear that apparatuses as illustrated in FIGS. 5 and 6 can be used in an entirely analogous manner if, instead of water, a eutectic mixture is used, and the liquid phase thereof is circulated outside the accumulator.

If it is desired to circulate a mixture of the liquid phase and the solid phase, thereby to transport a larger number of frigories per unit of volume, in an apparatus of this type one will naturally discharge the suspension closely below the boundary face of the aqueous phase 46 and the layer of heat transfer liquid 47, as that is where the solid phase collects. In such a case the warmed-up liquid phase will be returned to the bottom of the accumulator. Furthermore, in such a case no coalescer will be included in the circulation duct, and it will be preferable to temporarily stop pumping cooled heat exchange liquid.

What I claim is:

1. An accumulator for heat or cold, comprising a container filled for the greater part with a layer of buffer material melting at a constant temperature and a considerably smaller layer of heat transfer liquid having a lower melting point than the buffer material and a specific gravity lower than both that of the solid and that of the liquid buffer material, said transfer liquid being virtually immiscible with the buffer material, the container having a conduit for discharging heat transfer liquid from said layer at a location near the top of the container to devices outside the accumulator, a supply conduit for returning heat transfer liquid to a distributor near the bottom of the layer of buffer material for causing the transfer liquid to flow upwardly in direct contact with the buffer material, at least one coalescer comprising a mat of knitted threads or wires united into a spatial network between the buffer material and the outlet for the heat transfer liquid for retaining solid and liquid particles of the buffer material which otherwise may be entrained with the discharged transfer liquid, said buffer material being water or a eutectic aqueous solution of one or more salts having a melting point less than or equal to 0° C.

2. An accumulator as claimed in claim 1, wherein the supply conduit for transfer liquid is connected to a distributor comprising a plate having a large number of openings therein, said openings having a diameter of 0.4–1.0 mm.

3. An accumulator as claimed in claim 2, wherein said distributor is a perforated conical plate.

4. An accumulator as claimed in claim 1, comprising a discharge conduit for liquid buffer material adjacent to the bottom and a supply conduit for warmed-up liquid buffer material in the top of the container.

5. An accumulator as claimed in claim 1, comprising a compensation chamber, the bottom part of which is in open communication with the space for buffer material in the container, and the top end of which comprises means for passing a gas into the compensation chamber in a controlled manner when the level of the liquid in the accumulator is lower than a pre-selected limit, and means for discharging gas from the compensation chamber in a controlled manner when the level of the liquid in the accumulator is above a selected limit.

* * * * *